United States Patent [19]
Bedi

[11] Patent Number: 5,122,020
[45] Date of Patent: Jun. 16, 1992

[54] SELF LOCKING FASTENER

[76] Inventor: Ram D. Bedi, 6058 Wing Lake Rd., Birmingham, Mich. 48010

[21] Appl. No.: 512,943

[22] Filed: Apr. 23, 1990

[51] Int. Cl.$^5$ .................... F16B 39/30; F16B 39/34
[52] U.S. Cl. .................... 411/302; 411/310; 411/902; 470/12; 470/2 I
[58] Field of Search .............. 411/301, 302, 306, 310, 411/311, 324, 902; 10/86 A

[56] References Cited

U.S. PATENT DOCUMENTS

| | | | |
|---|---|---|---|
| 3,498,352 | 3/1970 | Duffy | 411/302 |
| 3,552,467 | 1/1971 | Bergere | 411/301 |
| 3,568,746 | 3/1971 | Faroni et al. | 411/302 |
| 3,731,724 | 5/1973 | Dorflinger | 411/302 |
| 3,818,525 | 6/1974 | Bedi . | |
| 4,023,224 | 5/1977 | Frailly . | |
| 4,033,393 | 7/1977 | Bedi . | |
| 4,060,116 | 11/1977 | Frailly . | |

*Primary Examiner*—Neill R. Wilson
*Attorney, Agent, or Firm*—Basile and Hanlon

[57] ABSTRACT

Reusable self locking fasteners, and methods of making the same wherein the self-locking characteristic is derived from a metallurgically bonded metal patch comprising a metal or metal alloy selectively applied to a specific region of the threaded surface of the metal fastener in a metal paste or powder form and fusing the same under heat. The metallic patch so achieved may comprise a single metal or metal alloy or a composite of metals or metal alloys selectively and metallurgically bonded to the threaded surface of the metal fastener by single or multiple metal paste or metal powder applications.

The convex/concave curve of the fused metal having a radial thickness,
1. that is greatest substantially midway between the two radial planes, and
2. that gradually diminishes from the midway point as the material approaches the radial planes in order that the exposed surface of the material forms only a small angle to a tangent to the surface of the threads at the radial planes.

19 Claims, 1 Drawing Sheet

SELF LOCKING FASTENER

BACKGROUND OF THE INVENTION

1. Field of the Invention

This invention relates to reusable self locking fasteners and, in particular, relates to the method of applying metal patch to provide the self locking characteristics.

2. Description of the Relevant Art

A variety of self locking threaded fasteners have been utilized in the past. One type of prior art self locking fastener employed a plastic patch which utilized the elastic memory of the plastic material to maintain an adequate locking torque over a number of reuses of the fastener. While these plastic patch fasteners have been generally satisfactory in some applications, their usage has been somewhat limited or impaired by the relatively low modulus of elasticity of the plastic patch, causing the patch to provide only a limited locking torque; by their relatively poor performance in high temperature environments or in applications involving the use of certain organic fluids (e.g. solvents); and by the tendency of the plastic patch to cut. In particular, there has been heretofore a long-felt need for an improved self locking fastener having an improved reusability characteristic, a high locking torque and/or having the ability to perform well at high temperatures, and/or in the presence of organic fluids.

Another type of prior art self-locking fastener involved the use of a plated metallic patch harder than at least one of the corresponding threaded members. These types of hard metallic patch fasteners, such as may be seen in Bergere U.S. Pat. No. 3,552,467, operate by deforming at least one of the mating threaded members. While these fasteners are satisfactory for some uses if properly sized and if utilized with an easily deformable member, such as a nut, they will tend to permanently deform or destroy the threaded members if utilized with a relatively undeformable member such as a threaded engine block or if the patch is oversized.

Another type of prior art self-locking fastener utilized a relatively soft metallic coating on the threaded surface. This type of fastener such as is shown in Woodward (U.S. Pat No. 1,368,087) tended to provide relatively low locking torque and also tended to be relatively poor for repeated applications as the coating would tend to simply extrude after the first on-off cycle.

Somewhat more satisfactory metal patched prevailing torque fasteners were produced in Bedi (U.S. Pat. Nos. 3,818,525, 3,831,213 and 4,033,393) which disclosed spraying a selected portion of the threaded surface spraying with a molten metallic material to provide a relatively spongy or porous metallic patch over a relatively large, undefined threaded portion of the fastener.

In the Bedi invention, the metallic spray material comprises an alloy of copper and zinc which is applied to the fastener is a semi-molten particulate form with a flame spray apparatus. The fastener sequentially moves past the various pretreatment work stations and thereafter passes the metal spray work stations in a production line operation.

In the Bedi invention the fastener selected is usually a bolt member having a threaded shaft portion formed of a suitable steel and spongy metal patch material bonded to its shaft portion through the grit blasted porosity of the substrate and hot molten surface of the metal particles impinging the fastener surface at high velocity. The metal sprayed bolts must, then, be heat treated to sinter the porous metal patch deposit for an effective bond between the patch and the threaded surface. Without a final heat treatment process such as that described in U.S. Pat. Nos. 4,060,116 and 4,023,224 to Frailley, the metal patch applied using the Bedi method cannot be effectively and permanently adhered to the fastener.

Complete flame spray installation such as that described in U.S. Pat. No. 3,818,525 to Bedi requires specialized equipment to supply metallizing wire, controlled compressed air, fuel gas and oxygen, as well as appropriate safety equipment.

Flame spray guns suitable for carrying out the metal patching of bolts are commercially available for example from Metco, Inc. of Westbury Long Island, N.Y. While various flame spray guns are available from Metco, the type 12E is most suitable gun for this purpose. These guns are precision engineered for combustible gas spraying of the appropriate metallizing wire being fed into the spray nozzle at highly controlled rate.

Metallizing wires have to be specifically made for flame spray application. Oversized wires will often stick in the gun nozzle causing extreme wear of the gun parts and producing defective coatings due to erratic feeding. In addition to carefully controlling size, the metallizing wires must be free from kinks, bends and other physical imperfections for trouble-free flame spraying. Often the wires are treated with special lubricants to lessen nozzle wear and minimize fusing. These lubricants must be quality controlled to inhibit corrosion. Though coiling of the wire seems like a simple operation, coil diameter must be carefully controlled. The tendency to spiral, if not properly controlled, could cause down time and poor quality deposit quality.

In flame spray applications, the flame spray gun includes a fuel gas control unit which must include multiple stage regulator devices to monitor highly controlled combustion and hence flame spray deposit quality. In a flame spray gun, highest efficiency is obtained when the flow of fuel gas and oxygen is exactly balanced.

In addition typical flame spray guns require approximately 30 cubic feet of free air per minute at 65 psi. A pressure drop of 10 psi is required by the air regulator in order to achieve satisfactory wire feed rate to control the metal spray deposit thickness and quality.

Compressed air usually contains enough oil and moisture to weaken bonding strength of sprayed coatings. To prevent this an air compressor after cooler and appropriate filter must be used. Clean and dry quality compressed air is imperative to obtain a top quality flame spray deposit. The use of air flow meters are essential to monitor the consistency of the metal spray deposit.

In flame spray processes, it is very expensive to obtain at-will contour of the flame sprayed coating.

The flame spray process is limited because it cannot produce an at-will coating pattern without undergoing expensive masking and an additional machining step to contour the edge build up during spraying to produce acceptable self locking fastener. If the edge build up is not machined, the flame sprayed metal patch will tear off the substrate because of the mechanical bond nature of the flame sprayed metal patch.

In addition to being technically exacting, flame spraying can be hazardous. The process requires the use of combustible gases, containers and hoses under high pressure, and potentially irritating or toxic spray materials. Because of the nature of the materials used, special precautions must be observed when lighting the gun. Additional precautions must be taken during use because of the hot and hazardous nature of the stream of spray metal, the possibility of spray gun backfire and the fact that metal dust, having considerable calorific value, can be explosive. To minimize the danger of dust explosion resulting from flame spray, adequate ventilation must be provided. Because of the toxic nature of the dust, a water wash wet collector must be used in the exhaust gas stream to collect over sprayed metal powder.

Because of the nature of the equipment used in flame spray procedures, great care and caution must be observed in the work-place. Charged gas cylinders are potentially dangerous and hence have to be stored, used and moved under local, state, and federal regulations. No oil and grease can be used on oxygen equipment. Eye protection with specially designed, industrially accepted hardened green lenses must be used by the operators and those working near flame spray operations. Noise from metal spray combustion guns cannot exceed the maximum allowable limit as set by OSHA act of 1970. Any personnel in the immediate vicinity of such operations must wear hearing protection. Failure to heed to the prescribed precautions and safety measures while operating flame spray metallizing devices can result in accidents, causing property damage, personal injury or death.

According to the Bedi patents the process of metal deposition on a select threaded portion of the fastener requires the use of complicated equipment to atomize metallic materials through combustible flame spray guns. Because this process involves intricate controls to monitor the quality of wire, the quality of the compressed air and the mixture of combustible gases, the process can be extremely expensive to implement. Additionally significant amounts of metal are over sprayed and must be entrapped before escaping in to the environment. To say the least application of a metal patch according to the Bedi patents, is complicated, noisy, potentially hazardous, wasteful, expensive and must be followed by said Frailley heat treat process to be satisfactory.

Thus it is desirable to provide an improved reusable self-locking fastener which is capable of relatively high locking torques, is useable in relatively high temperatures and in organic fluid environments and is nondestructive to mating thread members with which it is associated. It is also desirable to provide an improved method of applying such a metal patch which is simple, economical, quiet, non-hazardous and non-wasteful. It is also desirable to provide self-locking fastener having improved resistance to high temperatures and organic fluids. It is also desirable to provide a superior interference thread self locking fastener over the prior mechanically bonded metal patch. It is also desirable to provide an improved reusable self-locking threaded fastener in which the filler metal is fused to select threads of the fastener in either its unheat treated or heat treated state.

SUMMARY OF THE INVENTION

The present invention pertains to a metal patch and a method for applying the same in which a self-locking characteristic is imported to a threaded metal fastener by cleaning at least a selected region of the threaded portion of the fastener to expose a clean metal surface thereon and thereafter applying measured amount of metal brazing paste and/or powder and fusing the same through direct or indirect externally applied heat to produce a metallic patch metallurgically bonded on a selected threaded portion of the fastener. The metallic patch can have a predetermined degree of porosity desirable for improved adhesion characteristics between mating fastener threads. The porosity of the metallic patch may be modified by the incorporation, the effective amounts of a suitable compound which will evolve carbon dioxide on heating. Examples of suitable compounds include inorganic salts such as alkali metal carbonates and organic materials containing carboxylic acid selected from the group consisting of sodium carbonate, calcium carbonate and mixtures thereof.

The metal patch of the present invention can be directly applied to heat treated and/or un-heat treated fasteners.

The method of the present invention can also include an optional pretreatment cleaning step which comprises the application of solvents and/or water based cleaning compounds to remove any residual chips and lubricant used to form the fastener and a drying step to remove any moisture. The fastener is thereafter selectively metal brazed to provide it with the desired selflocking characteristics.

The fastener according to the invention comprises a main body portion including a threaded portion composed of a first metallic material, and a patch of a second metallic material metallurgically bonded to a well-defined, discrete portion of the threaded surface of the threaded portion of the fastener. "Fastener" as defined herein comprises a bolt and/or a nut having threaded portion formed of a suitable steel to which the porous patch material may be bonded. The fastener may be a nut or bolt of any desired size.

The second metallic material consists essentially of a suitable metal, combination of metals or a metal alloy and any carriers, or additives necessary to facilitate brazing operations. The metal, alloy or combination thereof selected is one which is amenable to brazing operations, is capable of forming a metallurgical bond with the surface of the first metallic material, and, when present as a metallic patch, has a lower modulus of elasticity than the mating fastener material. "Brazing" as defined herein is the metallurgical process.

In the process of the present invention, a suitable metal, metal alloy or mixture thereof in the form of a metal paste or powder can be applied to the selected region of the fastener by a suitable syringe-type device. After the metal patch material is applied, the fastener can be subjected to a temperature sufficient to initiate and sustain brazing action for the selected metal, metal alloy, or combination thereof. This exposure to elevated temperature occurs in an environment which will inhibit the capillary action of the selected metal, metal alloy, or combination thereof thereby limiting the area in which the metal patch overlays the threaded surface of the fastener and is metallurgically bonded thereto. The process of the present invention contemplates that the fasteners will be moved sequentially past various pretreatment work stations, past metal patch application work stations, and then through an environmentally controlled fusion station in a production line operation.

BRIEF DESCRIPTION OF THE DRAWINGS

Further objects, features and advantages of the invention will become apparent from the detailed description of the preferred embodiment and from the accompanying drawing in which like reference numerals are used to denote like elements throughout the various figures in which.

DETAILED DESCRIPTION OF THE PREFERRED EMBODIMENT

Figure 1A:
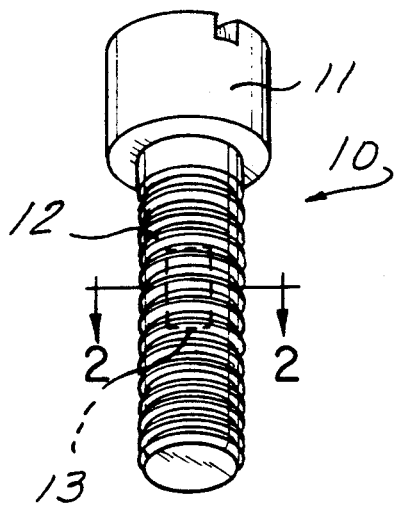
FIG. 1A is a perspective view of a self locking bolt-type fastener having a patch of the filler metal brazing material applied to a select thread region.

In the method and device of the present invention the self-locking feature is provided to the selected threaded fastener member by the application of a porous metallic patch having a lower modulus of elasticity than the corresponding threaded members to substantially fill the troughs located between the thread crests. The desired circumferential area of the patch will depend upon the desired prevailing torque value with which the fastener is to be provided. This circumferential area covered by the metal patch is sufficient to provide interference with the threaded area of the mating fastener member and to be substantially resilient when compressed between the two mating fastener members to force the mating threads into locking contract. Preferably the applied patch is made of a material which allows it to deform either resiliently or within its elastic limits upon engagement of the mating threads while also retaining lubricants to resist the threads cutting the patch. On disengagement, the patch tends to restore itself to its original dimensions. Accordingly, on reuse, it is again effective to provide significant locking contact between associated fastener members.

In the process of the present invention a metal patch is metallurgically bonded to a discrete defined portion of the threaded fastener member to produce an interference fit, self-locking fastener. This is achieved by carefully controlling the filler metal alloy composition, the point of contact between the filler metal and the treated region, and carefully regulating the brazing/heat treatment environment and temperature to contain the capillary action of the filler metal. When the capillary action of the filler metal is contained, the brazing action will be confined to a localized area of the threaded region. Thus, the interference thread self-locking feature will primarily depend upon the physical properties of the filler metal.

Brazing, as discussed in report #732 *American Machinist,* Apr. 1981, has proven to be a very practical and desirable method for joining of metal parts of similar or dissimilar metals to produce a structurally sound assembly. According to American Welding Society (AWS) and, as the term is defined herein "brazing" is a localized coalescence of metals produced by heating the materials to suitable temperature using filler metal in an controlled atmospheric environment. In the conventional brazing operations, the filler material is distributed between closely fitted assembly components of a joint through capillary action.

In conventional brazing operations, the parts to be brazed are essentially free from any metal oxides. Furthermore, the heating environment of the furnace is such that minimal or no metal oxides are formed during the procedure. This permits the filler metal to creep all around the joint by itself through the capillary action of the molten filler metal. The capillary action is so powerful that a minute amount of filler metal applied at one location of the assembly joint will spread all around the joint in a quite uniform manner. However conventional brazing processes do not involve any melting of the assembly component metals. Successful conventional brazing primarily depends upon the principle of capillary action of the molten or fused filler metal to distribute uniformly around the joint.

In order to braze uniformly, if vacuum is not available, a controlled atmosphere furnace with a low dew point such as −60° is used. The lower the dew point, the lower the availability of oxygen from the thermal decomposition of water and hence oxide formation of the surface of component metals is minimized. The absence of oxide formation on metal surfaces promotes the capillary action of the filler metal to provide a metallurgically sound joint between the component surfaces.

Thus if the filler metal is applied to a fastener member such as a nut or bolt and brazed under normal brazing conditions as recommended by the brazing metal paste, powder or rod supplier, the fastener will become coated with the filler metal uniformly all over the fastener surface inside, outside and the sides. The threaded member of a nut so processed will become undersized and the threaded member of the bolt will become oversized and out of specification. Fasteners, when processed this way, will defeat the purpose of self locking fasteners as produced through interference thread mechanism.

It has been found, quite unexpectedly, that discrete application of a measured amount of filler metal composition either in paste or powder form to a select location of the threaded region prior to removal of the metal oxide coating will provide the benefits of localized fusion of the filler metal to the metal surface to which the filler metal is applied. Without being bound to any theory, it is believed that the presence of an oxide layer on the threaded surface limits the capillary action of the filler metal so that fusion of the filler metal becomes localized to produce an at-will patch region.

A variety of commercially available filler metal alloys can be used in the process of the present invention. Selection of the specific preferred filler metal to be employed is determined by the fastener material employed and self locking requirements, such as prevailing torque desired. Examples of filler metal alloys suitable for various applications are set forth in Table I. Functional equivalents of those materials enumerated therein are contemplated to be within the purview of this invention.

TABLE I

| Composition (% by weight) | | | Solidus Temp. | Liquidus Temp. |
|---|---|---|---|---|
| A. Filler metal compositions for aluminum base fasteners and/or low prevailing torque applications. | | | | |
| Al | Si | Others | | |
| 1. 76 | 10 | 10 (Zn) | 960° F. | 1040° F. |
| 2. 88 | 12 | — | 1070° F. | 1080° F. |
| B. Filler metal compositions for ferrous base fasteners and/or medium to high prevailing torque applications. | | | | |

TABLE I-continued

| Composition (% by weight) | | | | Solidus Temp. | Liquidus Temp. |
|---|---|---|---|---|---|
| Cu | Zn | Sn | Others | | |
| 1. 27.25 | 64.75 | 7.5 | 0.5 (Pb) | 1385° F. | 1440° C. |
| 2. 53 | 38 | — | 9 (Ag) | 1450° F. | 1565° F. |
| 3. 80 | — | 20 | — | 1470° F. | 1635° F. |
| C. Filler metal preferred nominal composition for high strength alloy base fasteners and high prevailing torque applications. | | | | | |
| Ni | Cr | Fe | Si | B | |
| 1. 74, | 14, | 4.5, | 4., | 5,3 | 1790° F. | 1900° F. |
| 2. 92.5, | —, | —, | 4.5, | 3 | 1800° F. | 1900° F. |
| 3. 94.5, | —, | —, | 3.5, | 1.9 | 1800° F. | 1950° F. |
| D. Filler metal preferred nominal composition for precious metal alloy base fasteners and low to medium prevailing torque applications. | | | | | |
| Au | Ag | Cu | Zn | Cd | |
| 1. 50.15, | 20.0, | 11.0, | 2.0, | 16.85 | 1270° F. | 1360° F. |
| 2. 25.15, | 45.0, | 19.85, | 10.0, | — | 1305° F. | 1345° F. |
| 3. 38.4, | 25.7, | 19. | 0.9, | 16.0 | 1175° F. | 1300° F. |

In accordance with the present invention the drawbacks of the prior art of self-locking fastener such as mechanical bond and hence an inferior product has been overcome to the extent that the reusable self locking fastener is capable of producing higher prevailing torques on multiple uses than the self locking fastener produced through flame spraying. Hence, the product of the present invention can go through more multiple uses at good prevailing torque values than flame sprayed self locking fasteners. Furthermore, the method of the present invention can be practiced economically and technically successfully on small nuts such as ⅜", ½", ¾" sizes. In contrast conventional flame spray techniques are, at best, limited to much larger nuts such as those two inches in diameter or greater. Furthermore conventional flame spray methods do not produce a metallurgical bond between the patch and the fastener even after heat treating.

In the present invention a metallurgical bond is provided by the application of an appropriate filler metal paste or powder to the select threads of the fastener and fusing the filler metal to the metal of the fastener threads at an appropriate environment and at appropriate temperature. The conditions of the fusion environment and temperature employed are chosen such that capillary characteristics of the filler metal on fusion are almost completely annulled so that the metal patch fuses on the specified location and does not spread beyond the applied dimensions. This provides the required prevailing torques on multiple uses.

The bulk modulus of elasticity of the fused metal patch is lower than that of the corresponding threaded members. The patch substantially fills the troughs between the threaded crests. The porosity of the patch of the present invention can be modified to allow the patch to give under tightening compression and also to retain lubricants to resist cutting of the patch. One method for imparting such porosity will be described in detail subsequently. The fused filler metal patch though being porous, is denser than the highly porous and spongy flame sprayed metal deposit. The fused filler metal patch provides satisfactory prevailing torques with only 10° circumferential patch coverage as against 90° coverage required for successful conventional flame sprayed procedures.

The fused filler metal patch has a metallurgical bond to the metal fastener which is superior to the mechanical bond produced through flame spraying and subsequent heat treatment processes. The filler metal paste/powder can be mechanically applied at will in any pattern. When fused according to the fusion process of the present invention, a metal patch will be produced without any undesirable build up of metallic material. This eliminates the need for any subsequent machining operations. Because of the higher density of the filler metal deposit, satisfactory prevailing torques can be achieved with as little as a 10° to 20° circumferential patch coverage. In contrast, a patch applied by flame spray must have at least 90° circumferential coverage to achieve similar results.

As indicated previously, in many instances, increased patch porosity is desirable for lubrication, compressibility, etc. Where such characteristics are sought, an effective amount of a carbon dioxide donor source (organic or inorganic) can be incorporated into the filler metal material prior to brazing. Suitable carbon dioxide donor sources include alkali metal carbonates such as those selected from the group consisting of sodium carbonate, calcium carbonate and mixtures thereof. Functional equivalents of such above-listed compounds are also considered to be within the purview of the invention.

The amount of carbon dioxide donor is determined by the amount of porosity desired. In general, between about 0.001 to 2.0% and about 0.10% by weight can be employed.

Figure 1B:
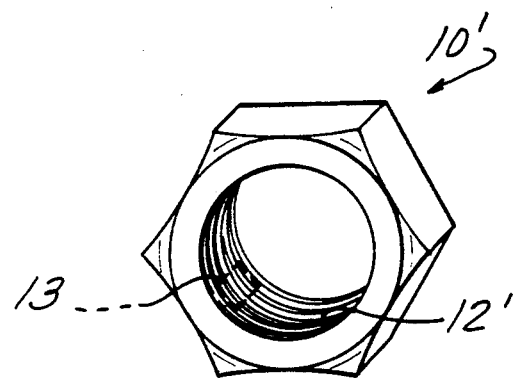
FIG. 1B is a perspective view of an alternate self locking nut-type fastener having a patch of the filler metal brazing material applied to a select thread region.

With reference to FIG. 1A, the first embodiment of the disclosed self locking fastener of the present invention comprises a threaded bolt fastener 10 of standard form having a threaded shaft portion 12, and a filler metal fused patch 13 is provided on the selected are of the shaft portion 12. With reference to FIG. 1B, the second embodiment of the disclosed self-locking fastener of the present invention comprises a threaded nut fastener 10' having a threaded interior portion 12', and a filler metal fused patch 13 is provided on selected areas of the interiorly threaded portion 12'.

Figure 3:
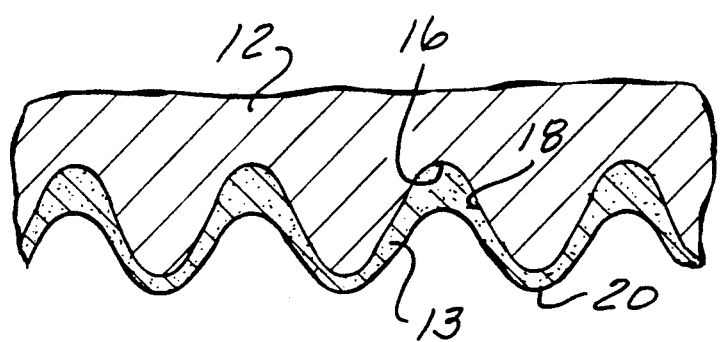
FIG. 3 is an enlarged fragmentary view in longitudinal section taken on line 3—3 of FIG. 2 showing the distribution of filler metal fused patch along the threaded surface of the fastener.

As seen in FIG. 3, when applied to either bolt 10 or nut 10', the metallic patch 13 covers and may, if desired, substantially fill the valleys or thread troughs 16. The metallic patch also covers the inclined helical bearing surface 18 and the crests 20 of the threaded surface of the shaft portion 12 or interior threaded portion 12' and mating threads of a complimentary element with which the fastener 10, 10' is assembled to provide increased frictional resistance against undesired loosening of the threaded engagement between the fastener 10, 10' and the complimentary element.

Figure 2:
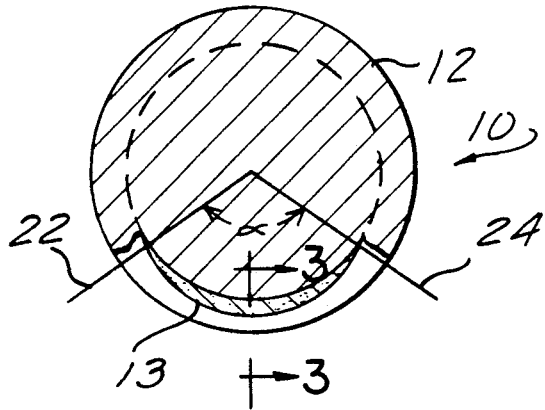
FIG. 2 is cross sectional view on line 2—2 of FIG. 1.

As is best seen in FIG. 2, the effective exposed surface of the metallic patch 13 extends in a continuous convex curve on a bolt and continuous concave curve on a nut from one radial plane 22 to another radial plane 24. The included angle between planes 22 and 24 is no greater than 120° and, preferably, no greater than 90°.

While it is preferred that the included angle of plane 22 and 24 be less than 90°, the angular extent of the patch may vary thereafter. The angular extent of the patch could be in excess of 60° in portions of the patch and 10° in an adjacent portion of the said patch. Such a construction could be utilized where a portion of the patch may shear away during mating of threaded members yet there would be no detrimental effect of the reusability characteristics of the fastener or the resilient deformation of the patch. In addition the angular extent of the fused filler metal patch could be less than 10° in which case a corresponding reduction in prevailing torque will result.

The radial thickness of the metallic patch 13 is greatest substantially midway between planes 22,24 and gradually diminishes in radial thickness as it approaches the limiting radial planes so that the exposed surface of the metallic patch 13 forms only a small angle to a tangent to the threaded surfaces at the limiting radial planes. This tapered patch configuration is important since it allows easy engagement of the fastener 10,10' with a complementary element while yet retaining superior reusability and resistance to undesired loosening of the resulting threaded engagement. As the variable radial extension occurs at least a portion of the patch will be resiliently elastically deformed. Although the patch is shown to have a generally rectangular configuration, it will be apparent that various other configurational patch shapes may be employed.

In the process of producing the present invention, all or a selected portion of the threaded shaft portion of the fastener (nut or bolt) may be initially subjected to a pre-treatment including various cleaning steps designed to remove any undesirable contaminants. Specifically, the fastener is first subjected to a brushing operation in which the threaded shaft portion is wire-brushed to remove any loose materials. Thereafter, the fastener is subjected to a solvent cleaning in which the shaft portion is cleaned with a suitable solvent such as trichloroethylene or methyl ethyl ketone to remove any soluble oils. The preliminarily cleaned fastener thereafter may undergo a grit blasting treatment in which the selected threaded shaft portion is subjected to grit blasting with between 20 to 50 mesh aluminum oxide for about 3 to about 5 seconds. After grit blasting, the fastener is clean air sprayed to remove any loose grit from the fastener.

Following this pretreatment of the fastener, a metallic paste/powder is applied to the select threads of the fastener by any number of mechanical means such as brushing, spraying, injection, etc. In the metal patching operation of the self-locking fastener, it is preferred that the metallic material to be applied in the metal patching operation be such that its bulk elastic modulus properties be less than the elastic modulus property of the mating fastener material.

After the metal paste or powder is applied, the fastener is subjected to a fusion operation under controlled heat and atmospheric conditions so that the capillary action of the fused filler metal is almost completely inhibited. This can occur by completing the process in an atmosphere where oxide formation is not strictly inhibited. Heat may be applied directly or indirectly to the fastener through the use of combustion heat such as flame and/or through the use of electricity including induction and resistivity methods. The metallic patch 13 is this formed on the surface of threaded shaft portion 12, 12'. The aforementioned tapered configuration or lack of edge build up of the patch produces itself automatically as the applied metal paste/powder melts and flows, by virtue of the circular shape of the fastener, and by the gravity action on the liquidus filler metal.

The filler metal paste/powder and the heat fusion equipment are commercially available from a variety of sources, for example, from Fusion Inc. of Willohby Ohio. While various filler metal paste/powder are suitable application in the invention process, filler metal containing copper, zinc and silver of various compositions have been found to be particularly well suited to the 1038 steel fastener material.

The fasteners having the metal patch of the present invention may undergo one or more post-treatment operations following the filler metal fusion step. For example, fasteners may be sized to ensure desired patch thickness or configuration and/or processed through heat-treatment operations to achieve the specified grain structure and hardness of the metal patched fastener and/or the fastener may be plated or zinc phosphate coated and/or treated with a light coat of lubricating material such as molybdenum disulfide, SAE 30 oil or wax.

Although the invention has been described thus far with reference to individual treatment of a single fastener, it will be understood that the invention process actually comprises a production line operation in which a plurality of brushing, cleaning, grit blasting, air spraying, preheating, metal patching, fusion and post-treating work stations are serially arranged in a given work area and fasteners are sequentially moved past the successive stations to achieve mass production of the invention fasteners. For example, fasteners may be moved by a suitable conveyor facility successively pass, cleaning, filler metal pasting, fusion, heat-treat fusion, cleaning and plating and/or lubricating stations.

In order to further illustrate the process of producing this invention, the following examples are provided. It will be understood that these examples are provided for illustrative purposes only and are not to be construed as limitative of the invention disclosed herein.

EXAMPLE NO. 1

A standard SAE steel 1038⅜"-16 heat treated #1104090N nut was brushed free of loose material by a wire brush, cleaned with trichloroethylene to remove oils, and then air-dried.

A filler metal paste containing a mixture of copper, zinc, and potassium fluoride and potassium borate flux mixed in an organic solvent to form a paste, was selectively dispensed to three nut threads by injecting 0.07 gm of the mixture of the threads through a micro syringe.

During the filler metal application, care was observed that no metal paste was applied to the initial two starting threads of the nut. Heat was applied through a controlled combustion flame of oxygen acetylene mixed with commercially available gas flux from the Gas Flux Co. of Elyria, Ohio. Fusion heat was stopped after about 15-25 seconds when the paste visually became molten. A metallic patch was formed having circumferential angle of about 40°.

On cooling, the metal patched nut was torque tested by using a standard ⅜" 16 bolt. The standard bolt was suitably secured, the test nut threaded into the bolt and maximum torque (identified in Table II as "maximum torque, tightening") was recorded as the patch traversed the bolt.

The test fastener was threaded out of the bolt and the maximum torque (maximum torque, loosening) was recorded as the patch-retraversed the bolt. This completed the first test cycle. Subsequent test cycles followed an identical procedure. The fastener produced by the process of the present invention retained its high resistance to loosening over a period of several use cycles and lost only a small fraction of its resistive ability with each successive cycle. Never before has a nut as small as ⅜" size been metal patched to achieve self-locking characteristics achieved herein.

TABLE II

| | NUT# 1104090N Prevailing Torque Test | | |
|---|---|---|---|
| Patch Material | Maximum Torque Tightening (in/lbs) | Maximum Torque Loosening (in/lbs) | Test Cycle |
| Copper, zinc | 120 | 65 | 1 |
| | 55 | 50 | 2 |
| | 40 | 30 | 3 |
| | 30 | 25 | 4 |
| | 30 | 25 | 5 |
| | 30 | 25 | 6 |

TABLE III

| | Bolt# 341090B Prevailing Torque Test | | |
|---|---|---|---|
| Patch Material | Maximum Torque Tightening (in/lbs) | Maximum Torque Loosening (in/lbs) | Test Cycle |
| Copper Zinc | 200 | 150 | 1 |
| | 100 | 85 | 2 |
| | 80 | 75 | 3 |
| | 70 | 50 | 4 |
| | 50 | 35 | 5 |
| | 50 | 40 | 6 |

EXAMPLE No. 2

A standard SAE 1038 bolt of ⅜"-16 and two inches long #341090B was metal patched as in Example 1 and torque tested in the same means as in Example 1. Results of this test are set forth in Table III.

The self-locking metal patched heat treated bolt produced by the invention process retained its high resistance to loosening of over a period of several use cycles and lost only a small fraction of its resistivity with each successive cycle. Never before has a heat-treated bolt when metal patched produced such good prevailing torques on several use cycles.

Without being bound to any theory it is believed that these desirable prevailing torque results for the metal patched heat treated nut and the bolt are primarily due to the metallurgical bond between the fused filler metal and the thread surface and the inhibition of the capillary action of the filler metal on fusion.

Although the invention has been described in its preferred forms with a certain degree of particularity, it is understood that the present disclosure of the preferred form has been made only by way of example and that numerous combinations of filler metal alloys, fusion environments to inhibit capillary action of the filler metal, methods of applying heat such as direct, indirect electrical including induction and combustion heating, methods of applying the paste/powder to the fasteners and conveying the same and so on are possible. These combinations may be resorted to without departing from the spirit and scope of the invention and hereinafter claimed.

What is claimed is:

1. A reusable self-locking metallic fastener comprising a body and a thread convolution formed on said body about a central axis, said thread convolution being adapted for engagement with a mating thread convolution, said thread convolution on said body including axially spaced thread crests and interposed troughs between the crests, means disposed on said thread convolution on said body for providing an interfering locking engagement with the mating thread convolution and retard relative rotational movement between said thread convolution on said body and the mating thread convolution and to effectively lock the thread convolutions together, said means for providing an interfering thread locking engagement comprising a metallic path having at least one layer of metallic material having a lower modulus of elasticity than said thread convolutions metallurgically bonded to said fastener body and extending axially over surfaces defining a plurality of said crests and substantially bonding to at least one of said troughs and one of said crests, said patch having an effective circumferential extension between about 10° and about 180°, said patch extending radially outwardly from said thread convolution on said body to engage said mating thread convolution when said thread convolutions are in threaded engagement at a point axially coincident with said patch.

2. The reusable locking fastener of claim 1 wherein said metallic material is resiliently compressible in a radial direction to provide said interfering engagement of said thread convolution at a point circumferentially opposite said patch.

3. The reusable locking fastener of claim 2 wherein said metallic material is a relatively porous material.

4. The reusable locking fastener of claim 2 wherein said metallic patch, consists between about 5% by weight and about 95% by weight of a brazable metal.

5. The reusable locking fastener of claim 4 wherein said metallic patch consists essentially of a brazable metal selected from the group consisting of aluminum, copper, nickel, zinc and mixtures thereof and an additive material selected from the group consisting of silicon, zinc, lead, silver, chromium, iron, boron, and mixtures thereof.

6. The reusable locking fastener of claim 4 wherein said metallic patch consists essentially of a brazable metal selected from the group consisting of gold, silver and mixtures thereof and an additive material selected from the group consisting of copper, zinc, cadmium and mixtures thereof.

7. The reusable locking fastener of claim 2 wherein said metallic patch has a cross-sectional area lying in a radial plane, said cross-sectional area being of generally crescent shape to ensure at least a portion of said metallic patch is resiliently compressed between said thread convolutions when said thread convolutions are in locking engagement.

8. The reusable locking fastener of claim 7 wherein said metallic patch is brazed onto said body.

9. The reusable locking fastener of claim 8 wherein outlying edges of said metallic patch taper smoothly and outwardly from said thread convolutions to form said cross sectional area of generally crescent shape.

10. The reusable locking fastener of claim 8 wherein said metallic patch has an effective circumferential extension sufficient to provide desired interference threads characteristics, said circumferential extension being between about 20° and about 90°.

11. The reusable locking fastener of claim 10 wherein said thread convolution formed on said body is a male thread.

12. The reusable locking fastener of claim 10 wherein said thread convolution formed on said body is a female thread.

13. A reusable self-locking fastener capable of high temperature application comprising a metal body and a thread convolution formed on said body about a central axis, said thread convolution being adapted for engagement with a mated convolution, said thread convolution on said body including axially spaced thread crests and interposed troughs between the crests, means disposed on said thread convolution on said body for providing a substantially non-damaging interfering engagement with the mating thread convolution to retard relative rotational movement between said thread convolution on said body and the mating thread convolution to effectively lock the thread convolutions together, said means for providing the interfering engagement comprising a metallic patch metallurgically bonded to said body and comprising at least the mating layer of brazed metallic material having a lower modulus of elasticity than said thread convolutions extending axially over surfaces defining a plurality of said crests and substantially filling at least one of said troughs, said patch being thicker in said thread troughs than on the adjacent thread crests, said patch extending radially outwardly from said thread convolution on said body to engage said mating thread convolution when said thread convolutions are in threaded engagement at a point axially coincident with said patch, said metallic patch effectively extending circumferentially a distance of between about 20° and about 120° of said thread convolution on said body, said metallic patch having an outer surface oriented to contact the mating thread convolution with which it is adapted to engage and an inner interface with said underlying crests and troughs, said interface characterized by a region of localized coalescence between said metallic material and said underlying metal body, said metallic patch being substantially resiliently compressible to provide said interfering locking engagement of said thread convolutions at a point circumferentially opposite said patch when said patch is engaged with said mating thread convolution.

14. The reusable self-locking fastener of claim 13 wherein said metallic patch comprises a porous metallic layer.

15. The reusable self-locking fastener of claim 14 wherein said interfering locking engagement has an initial torque value greater than about 100 in/lbs.

16. The reusable self-locking fastener of claim 13 wherein said patch has an effective circumferential extension between about 20° and about 89°.

17. A reusable, self-locking, externally threaded fastener comprising body and a threaded convolution formed on said body about a central axis, said thread convolution being adapted for engagement with a mating thread convolution, said thread convolution on said body including axially spaced thread crests and interposed troughs between the crests, means disposed on said thread convolution on said body for providing an interfering locking engagement with the thread convolution to retard relative rotational movement between said thread convolution on said body and the mating thread convolution to effectively lock the thread convolutions together, said means for providing an interfering engagement having an initial torque tightening value greater than about 100 in/lbs comprising a metallurgically bonded metallic patch of a lower modulus of elasticity than said thread convolutions bonded to said body and extending axially over surfaces defining a plurality of said crests and substantially filling at least one of said troughs, said patch being thicker in said thread troughs than on the adjacent thread crests, said patch extending radially outwardly from said thread convolution on said body to engage said mating thread convolution when said thread convolutions are in threaded engagement at a point axially coincident with said patch, said metallic patch having a cross-sectional area lying in a radial plane, said cross-sectional area being of generally crescent shape, said metallic patch comprising bonded metallic material metallurgically bonded to said body, said patch having a circumferential extension of less than about 120°, the uncovered portion of said threaded body being substantially diametrically opposed to the circumferential midpoint of the patch, said metallic material being substantially resiliently compressible in a radial direction to provide said locking engagement of said thread convolutions at a point circumferentially opposite said patch said metallic patch having an outer surface oriented to contact the mating thread convolution with which it is adapted to engage and an inner interface with said underlying crests and troughs, said interface characterized by a region of localized coalescence between said metallic patch and said underlying material.

18. The reusable locking fastener of claim 17 wherein said patch comprises at least one layer of brazed metallic material.

19. The reusable locking fastener of claim 18 wherein said patch has a circumferential extension of between about 20° and about 89°.

* * * * *